United States Patent
Park et al.

(10) Patent No.: US 8,798,621 B2
(45) Date of Patent: Aug. 5, 2014

(54) METHOD AND APPARATUS FOR PERFORMING IDLE-MODE OPERATION USING MOBILITY INFORMATION

(75) Inventors: Gi Won Park, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 95 days.

(21) Appl. No.: 13/262,226

(22) PCT Filed: Apr. 21, 2010

(86) PCT No.: PCT/KR2010/002495
§ 371 (c)(1),
(2), (4) Date: Sep. 29, 2011

(87) PCT Pub. No.: WO2010/123273
PCT Pub. Date: Oct. 28, 2010

(65) Prior Publication Data
US 2012/0034918 A1    Feb. 9, 2012

Related U.S. Application Data

(60) Provisional application No. 61/171,454, filed on Apr. 21, 2009.

(30) Foreign Application Priority Data

Nov. 9, 2009 (KR) .................. 10-2009-0107579

(51) Int. Cl.
*H04W 4/00* (2009.01)

(52) U.S. Cl.
USPC ............... 455/435.1; 455/436; 455/456.1; 370/338; 370/328

(58) Field of Classification Search
USPC ............... 455/67.1, 161.1, 426.1, 434, 435.1, 455/458, 515, 456.1, 436, 405; 370/338, 370/328, 315, 329, 332
See application file for complete search history.

(56) References Cited

U.S. PATENT DOCUMENTS

2001/0036834 A1* 11/2001 Das et al. .............. 455/458
2002/0049058 A1*  4/2002 Tee ........................ 455/437

(Continued)

FOREIGN PATENT DOCUMENTS

CN        101385364       3/2009
KR      1020070114933     12/2007

(Continued)

OTHER PUBLICATIONS

Ranging, Thesaurus.com, see pp. 1-3 (yellow highlighted).*

(Continued)

*Primary Examiner* — Mahendra Patel
(74) *Attorney, Agent, or Firm* — Lee, Hong, Degerman, Kang & Waimey

(57) ABSTRACT

A method and apparatus for performing a location update based on mobility information indicating a velocity of a Mobile Station (MS), and a method and apparatus for using a timer for a location update in a wireless access system are disclosed. The MS transmits a deregistration request message requesting initiation of idle mode to a first Base Station (BS), receives a deregistration command message including paging group information from the first BS, the paging group information including a primary paging group Identifier (ID) and primary paging offset of a primary paging group allocated to the MS, and a secondary paging group ID and secondary paging offset of a secondary paging group allocated to the MS, and activates a paging group location update timer after moving from the primary paging group to the secondary paging group. The deregistration request message includes first mobility information indicating a velocity of the MS and the paging group information is set based on the first mobility information.

14 Claims, 6 Drawing Sheets

(56) References Cited

U.S. PATENT DOCUMENTS

| | | | |
|---|---|---|---|
| 2002/0072369 A1* | 6/2002 | Sasada et al. | 455/435 |
| 2004/0198353 A1* | 10/2004 | Quick, Jr. | 455/435.1 |
| 2004/0203770 A1* | 10/2004 | Chen et al. | 455/435.1 |
| 2005/0250474 A1* | 11/2005 | Hong et al. | 455/411 |
| 2005/0277429 A1* | 12/2005 | Laroia et al. | 455/458 |
| 2008/0102789 A1* | 5/2008 | Sung | 455/406 |

FOREIGN PATENT DOCUMENTS

| | | |
|---|---|---|
| KR | 1020080075162 | 8/2008 |
| KR | 1020090031470 | 3/2009 |
| KR | 1020090034839 | 4/2009 |

OTHER PUBLICATIONS

The State Intellectual Property Office of the People's Republic of China Application Serial No. 201080017338.8, Office Action dated Nov. 5, 2013, 7 pages.

* cited by examiner

METHOD AND APPARATUS FOR PERFORMING IDLE-MODE OPERATION USING MOBILITY INFORMATION

This application is the National Stage filing under 35 U.S.C. 371 of International Application No. PCT/KR2010/002495, filed on Apr. 21, 2010, which claims the benefit of earlier filing date and right of priority to Korean Application No. 10-2009-0107579, filed on Nov. 9, 2009, and also claims the benefit of U.S. Provisional Application Ser. No. 61/171,454, filed on Apr. 21, 2009, the contents of which are all incorporated by reference herein in their entireties.

TECHNICAL FIELD

The present invention relates to an operation of an idle-mode Mobile Station (MS) in a wireless access system.

BACKGROUND ART

A brief description will be made below of idle mode of an MS and a paging group in relation to embodiments of the present invention.

Generally, idle mode is intended as a mechanism to allow an MS to become periodically available for downlink broadcast traffic messaging without requiring the MS to register to any particular Base Station (BS) while the MS moves in a radio link environment populated by multiple BSs.

The idle mode may be beneficial to the MS by relieving the MS of an active requirement for handover and normal operational requirements. The idle mode restricts the MS's activity to scanning during discrete periods, so that the MS conserves power and operation resources.

Besides, the idle mode may benefit a network and a BS by providing a simple and timely scheme for alerting an MS to pending downlink traffic directed toward the MS and by eliminating an air interface and network handover traffic from an inactive MS.

FIG. 1 illustrates an example of paging groups each including a plurality of BSs.

Paging is a function of, upon generation of an incoming call in mobile communications, locating an MS for which the incoming call is intended (e.g. detecting a BS or a Mobile Switching Center (MSC) to which the MS belongs). As illustrated in FIG. 1, a plurality of BSs supporting the idle mode may be divided into specific paging groups, covering paging areas.

The paging groups are logical groups. The purpose of these paging groups is to offer a contiguous coverage area in which the MS can be paged on a downlink if there is traffic targeted at it. Preferably, the paging groups are large enough for an MS to stay most of its time within the same paging group and small enough to render paging overhead reasonable.

FIG. 1 illustrates four paging groups defined over multiple BSs arranged in hexagonal grids. One BS may be a member of one or more paging groups. The paging groups are defined in a management system. A paging group may use a paging group-action backbone message. A Paging Controller (PC) uses another backbone message, paging-announce, to manage the list of MSs in the idle mode and initiate paging of an MS on all BSs belonging to a paging group.

DISCLOSURE OF INVENTION

Technical Problem

An object of the present invention devised to solve the problem lies on support of an efficient idle-mode operation for a Mobile Station (MS) and a Base Station (BS).

Another object of the present invention devised to solve the problem lies on a method and apparatus for reducing the number of excess location updates that an idle-mode MS performs.

Another object of the present invention devised to solve the problem lies on a method and apparatus for reducing the overhead of paging messages transmitted by a BS.

Another object of the present invention devised to solve the problem lies on a method for determining a paging group for allocation to an MS, using mobility information about the MS.

A further object of the present invention devised to solve the problem lies on a method and apparatus for defining a Paging Group Location Update (PG_LU) timer and performing a location update using the PG_LU timer according to mobility information about the MS.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The present invention relates to an idle-mode operation of an MS in a wireless access system, particularly to a method and apparatus for performing a location update based on mobility information indicating a velocity of an MS, and a method and apparatus for using a timer for a location update.

The object of the present invention can be achieved by providing a method for performing an idle-mode operation at an MS to which one or more paging groups are allocated, including activating a paging group location timer, when the MS moves from a primary paging group to a secondary paging group in idle mode, transmitting a ranging request message including mobility information indicating a mobility level of the MS to a serving BS after the paging group location update timer is expired, and receiving a ranging response message including new paging group information determined based on the mobility information. The mobility information may indicate one of 'fast', 'Medium' and 'Slow'. The mobility information may also indicate the absolute value of a current velocity of the MS or a mean velocity of the MS during a predefined time period.

The ranging response message may further include new paging group location update timer information determined based on the mobility information.

The method may further include receiving a deregistration command message including paging group information from the serving BS, the paging group information including a primary paging group ID and primary paging offset of a primary paging group allocated to the MS, and a secondary paging group ID and secondary paging offset of a secondary paging group allocated to the MS.

The method may further include monitoring a paging message at the primary paging offset, and monitoring a paging message at the secondary paging offset if the paging message is not received at the primary paging offset.

In another aspect of the present invention, provided herein is a method for performing an idle-mode operation at an MS to which one or more paging groups are allocated, including transmitting a deregistration request message requesting initiation of idle mode to a first BS, receiving a deregistration command message including paging group information from the first BS, the paging group information including a primary paging group ID and primary paging offset of a primary paging group allocated to the MS, and a secondary paging group ID and secondary paging offset of a secondary paging group allocated to the MS, and activating a paging group location update timer after moving from the primary paging group to the secondary paging group. The deregistration request message includes first mobility information indicating a mobility level of the MS. The paging group information is set by the first BS based on the first mobility information.

The method may further include transmitting a ranging request message including second mobility information indicating a mobility level of the MS to a second BS after the paging group location update timer expires and receiving from the second BS a ranging response message including new paging group information determined based on the second mobility information.

The ranging response message may further include new paging group location update timer information determined based on the second mobility information.

The method may further include monitoring a paging message at the primary paging offset, and monitoring a paging message at the secondary paging offset, if the paging message is not received at the primary paging offset.

The first mobility information and the second mobility information may indicate one of fast, medium and slow, respectively.

In another aspect of the present invention, provided herein is a method for supporting an idle-mode operation of an MS to which one or more paging groups are allocated, including receiving a deregistration request message requesting initiation of idle mode from the MS, and transmitting to the MS a deregistration command message including paging group information, the paging group information including a primary paging group ID and primary paging offset of a primary paging group allocated to the MS, and a secondary paging group ID and secondary paging offset of a secondary paging group allocated to the MS. The deregistration request message includes mobility information indicating a mobility level of the MS. The paging group information is set by the base station based on the mobility information. The mobility information may indicate one of fast, medium, and slow. The mobility information may also indicate a current or mean velocity of the MS.

The deregistration command message may further include paging group location update timer information set based on the mobility information.

The method may further include transmitting a paging message to the MS at the primary paging offset.

In a further aspect of the present invention, provided herein is an MS in idle mode, to which one or more paging groups are allocated, including a transmission module for transmitting a message, a reception module for receiving a message, a processor for controlling an idle-mode operation of the MS. The processor transmits a deregistration request message requesting initiation of idle mode to a first Base Station (BS), receives a deregistration command message including paging group information from the first BS, the paging group information including a primary paging group Identifier (ID) and primary paging offset of a primary paging group allocated to the MS, and a secondary paging group ID and secondary paging offset of a secondary paging group allocated to the MS, and activates a paging group location update timer after moving from the primary paging group to the secondary paging group. The deregistration request message includes first mobility information indicating a mobility level of the MS, and wherein the paging group information is set based on the first mobility information.

The processor may further include a paging group location update timer for supporting a paging group-based location update.

The processor further transmits a ranging request message including second mobility information indicating a mobility level of the MS to a second BS after the paging group location update timer is expired, and receives from the second BS a ranging response message including new paging group information determined based on the second mobility information.

The ranging response message further includes new paging group location update timer information determined based on the second mobility information. The first mobility information and the second mobility information indicate one of fast, medium and slow, respectively.

The processor further performs monitoring a paging message at the primary paging offset; and monitoring a paging message at the secondary paging offset, if the paging message is not received at the primary paging offset.

When the AMs is assigned to multiple paging groups with the same paging cycle and different paging offsets, the primary paging offset is less than the secondary paging offset. The time difference between two adjacent paging offsets should be long enough so that the ABS can (1) send a paging message to the AMS in the primary paging offset within a paging cycle, (2) when the AMS is in the primary paging group, receives a response to the paging message by the AMS before the secondary paging offset, and (3) retransmit the paging message to the AMS at the secondary offset within the same paging cycle only if a response to the paging message in the primary paging offset is not received.

The embodiments of the present invention are mere part of preferred embodiments of the present invention and it is clear to those skilled in the art that various embodiments reflecting the technical features of the present invention can be derived and understood from the following detailed description of the present invention as set forth below.

Advantageous Effects of Invention

The embodiments of the present invention have the following effects.

First of all, an MS and a BS can perform an idle-mode operation efficiently.

The number of excess location updates that an idle-mode MS performs can be reduced.

Further, since a BS transmits a paging message based on current paging group information allocated to an MS, the overhead of a paging message transmitted to the MS can be mitigated.

A BS or a PC can allocate a paging group to an MS based on mobility information about the MS. Therefore, as a BS or paging area for paging message transmission is adjusted according to the velocity of an MS, the MS can be efficiently paged.

Finally, an MS, BS or PC may set a PG_LU timer based on mobility information about the MS. Thus, the MS can update its location efficiently and the BS can reduce paging overhead.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Figure 1:
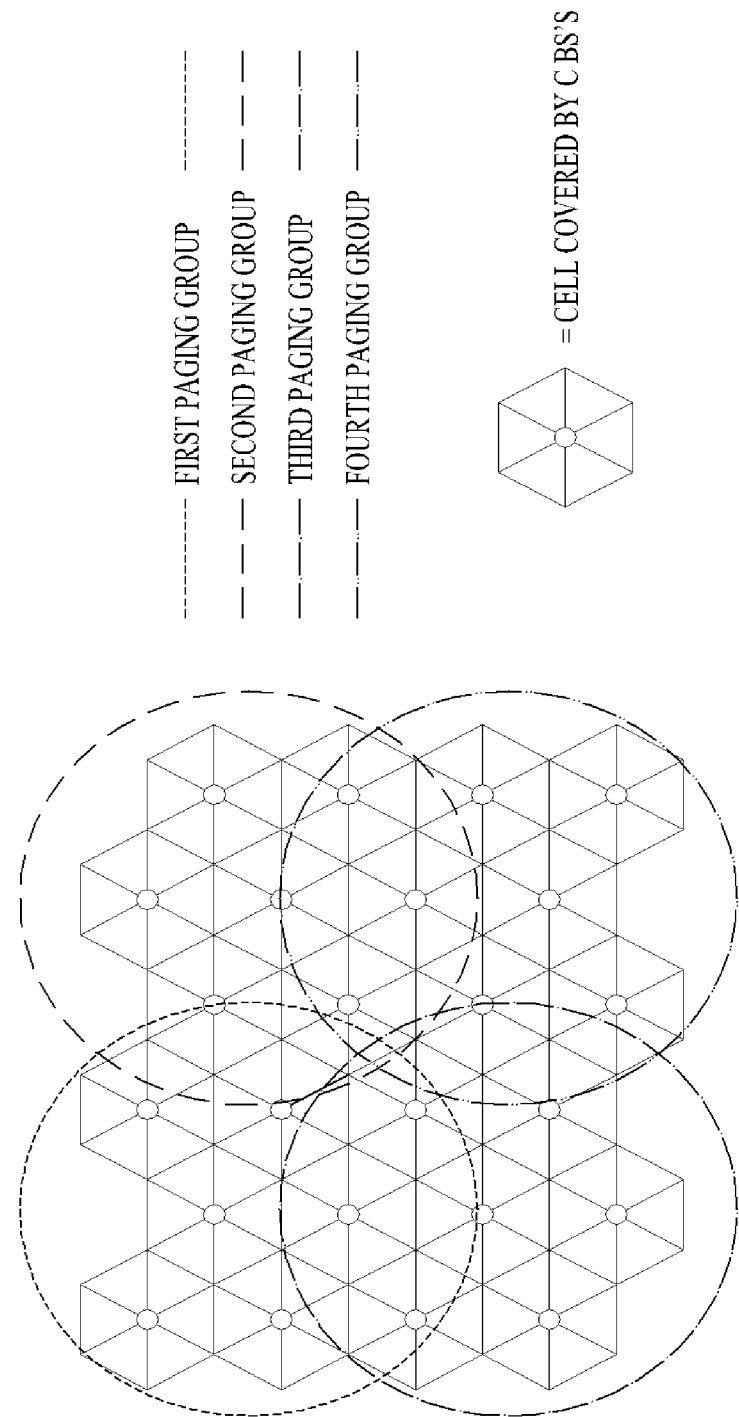
FIG. 1 illustrates an example of paging groups each including a plurality of Base Stations (BSs).

Embodiments of the present invention relate to an operation of an idle-mode Mobile Station (MS). The embodiments of the present invention provide various methods and apparatuses for performing a timer-based location update according to mobility information about an MS.

The embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may ruin the substance of the present invention, are not explained. And, procedures or steps, which can be understood by those skilled in the art, are not explained as well.

In the embodiments of the present invention, a description is made of a data transmission and reception relationship between a Base Station (BS) and an MS. Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc.

The term 'MS' may be replaced with the term 'User Equipment (UE)', 'Subscriber Station (SS)', 'Mobile Subscriber Station (MSS)', 'terminal', 'mobile terminal', 'Advanced Mobile Station (AMS)', etc.

A transmitter means a fixed and/or mobile node that transmits voice or data service and a receiver means a fixed and/or mobile node that receives voice or data service. Hence, an MS may be a transmitter and a BS may be a receiver, on an uplink. Likewise, the MS may be a receiver and the BS may be a transmitter, on a downlink.

The embodiments of the present invention are supported by standard documents disclosed for at least one of wireless access systems including an Institute of Electrical and Electronics Engineers (IEEE) 802 system, a 3rd Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, P802.16Rev2, and p802.16m documents which are the standards of IEEE 802.16.

All terms used for the embodiments of the present invention may be explained by the standard documents. Also, steps or parts that are not described to clarify the technical spirit of the present invention in the embodiments of the present invention may be supported by the documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to help the understanding of the present invention. These specific terms may be replaced with other terms within the scope and spirit of the present invention. For example, the de-registration response (AAI_DREG-RSP) message can be used instead of the de-registration command (AAI_DREG-CMD) message.

Figure 2:
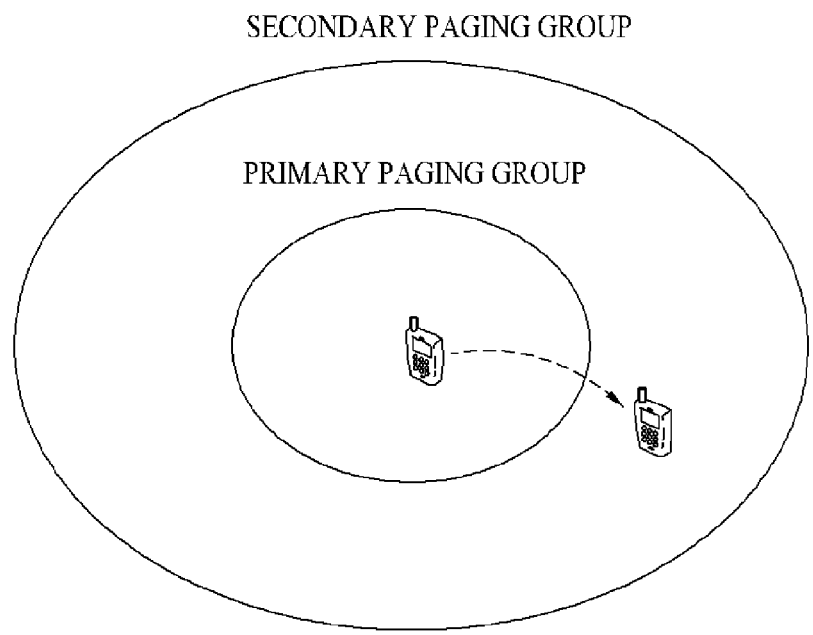
FIG. 2 illustrates paging groups which are applied to embodiments of the present invention.

FIG. 2 illustrates paging groups and a paging group-based location update, which are applied to embodiments of the present invention.

In the embodiments of the present invention, an ABS may be a member of one or more paging groups that may have different paging cycles and paging offsets.

An AMS may be assigned to one or more paging groups. If an AMS has a plurality of paging groups, different paging offsets of the different paging groups may be applied to the AMS. In the case where a plurality of paging groups are assigned to an AMS and the AMS moves within its allocated paging groups, the AMS dose not able to perform location update.

In the embodiments of the present invention, a Primary Paging Group (PPG) is defined. When more than one paging groups are allocated to an AMS, one of the paging groups is called a PPG and the rest of the allocated paging groups are called Secondary Paging Groups (SPGs). If only one paging group is allocated to an AMS, the paging group is considered as a PPG. A paging offset associated with the PPG is a primary paging offset and a paging offset associated with an SPG is a secondary paging offset.

When the AMs is assigned to multiple paging groups with the same paging cycle and different paging offsets, the primary paging offset is less than the secondary paging offset. The time difference between two adjacent paging offsets should be long enough so that the ABS can (1) send a paging message to the AMS in the primary paging offset within a paging cycle, (2) when the AMS is in the primary paging group, receives a response to the paging message by the AMS before the secondary paging offset, and (3) retransmit the paging message to the AMS at the secondary offset within the same paging cycle only if a response to the paging message in the primary paging offset is not received.

In the embodiments of the present invention, a PPG may refer to a paging group as large as or smaller than a general paging group. An SPG may refer to a paging group as large as or larger than the general paging group. The SPG may cover one or more PPGs, or it may be geographically independent. The sizes of the PPG and the SPG may vary depending on user requirements or channel environments.

In the embodiments of the present invention, it is assumed that a plurality of paging groups (e.g. a PPG and an SPG) are assigned to an AMS. The AMS updates its location when it moves to another paging group other than its current allocated paging groups. The AMS may determine whether its paging group has been changed by monitoring a Paging Group Identifier (PGID) during a paging listening interval.

For example, an idle-mode AMS may wake up at a primary paging offset and monitor PGID information in a paging group area during a paging listening interval. If the AMS fails to detect a primary PGID and instead, detects a secondary PGID, the AMS may wake up again at a secondary paging offset in the same paging cycle and monitor a paging message.

If the AMS fails to detect both the primary PG ID and the secondary PG ID, it may perform a location update with an ABS in the current paging area.

Figure 3:
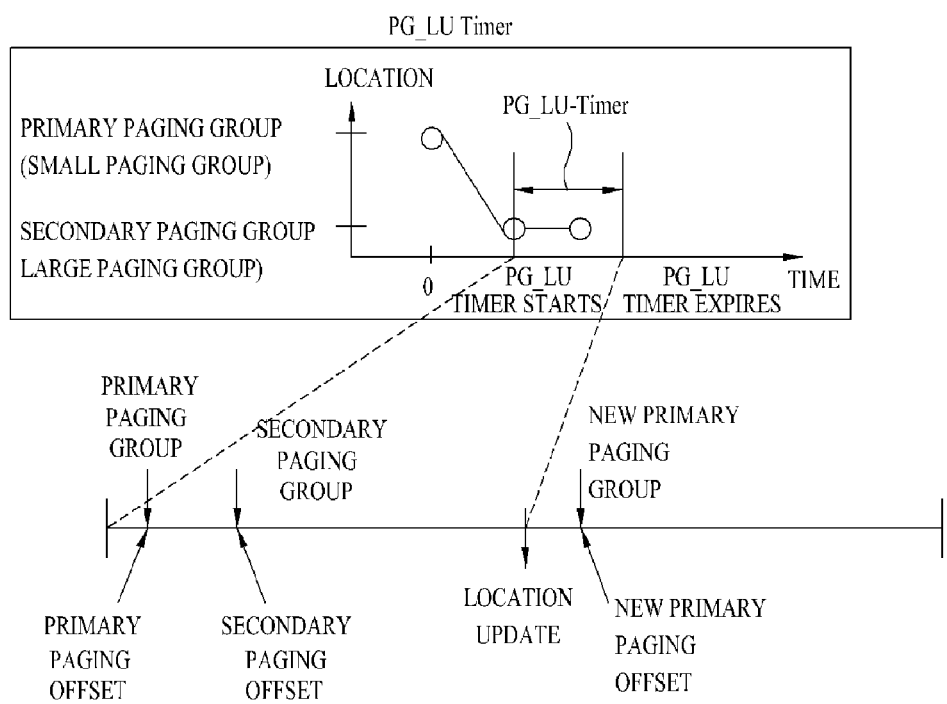
FIG. 3 illustrates an operation of a Paging Group Location Update (PG_LU) timer which is applied to embodiments of the present invention.

FIG. 3 illustrates an operation of a Paging Group Location Update (PG_LU) timer and a location update based on the PG_LU timer, which are applied to the embodiments of the present invention.

The illustrated case of FIG. 3 is based on the assumption that more than one paging groups (a PPG and an SPG) are assigned to an AMS. When the AMS moves out of the paging area of the PPG to the paging area of the SPG, the AMS may activate the PG_LU timer without immediately performing a location update.

In FIG. 3, the primary paging offset of the PPG is preferably less than the secondary paging offset of the SPG. The spacing between the primary and secondary paging offsets is preferably long enough for the AMS paged at the primary paging offset to transmit a response to an ABS before the secondary paging offset.

The AMS may monitor paging messages transmitted from the ABS at the primary and secondary paging offsets during the time period from the activation time of the PG_LU timer to expiration of the PG_LU timer. Or if the PG_LU timer is activated after the AMS leaves from the paging area of the PPG, the AMS may monitor a paging message at the secondary paging offset.

Upon expiration of the PG_LU timer, the AMS updates its location with an ABS of a current paging group. Notably, the AMS may perform the location update by transmitting a Mobile Ranging Request (MOB_RNG-REQ) message including mobility information specifying its velocity (Fast, Medium or Slow) to the ABS. The ABS and/or a Paging Controller (PC) may allocate a new paging group of a different size to the AMS based on the mobility information.

If the AMS returns to the PPG before the expiration of the PG_LU timer, the AMS releases and resets the PG_LU timer and does not perform location update. In addition, the AMS monitors a paging message at the primary paging offset. When the AMS leaves from the PPG and then the PG_LU timer expires, the AMS may update its location irrespective of whether it has returned to the PPG.

The ABS transmits a paging message to the AMS at the primary paging offset in order to page the AMS. When the ABS fails to receive a response message from the AMS, the ABS may page the AMS at the secondary paging offset.

In case the AMS fails to receive the paging message, the ABS may repeat paging message transmission at the primary and secondary paging offsets, a plurality of times according to a primary paging offset cycle and a secondary paging offset cycle. When the ABS has transmitted the paging message a plurality of times after the primary paging offset, if the time between transmission of the last paging message at the primary paging offset and the secondary paging offset is larger than the value of the PG_LU timer, the ABS may consider that the AMS has moved to another paging area. Therefore, the ABS may delete the AMS from a paging list or perform a forced location update with the AMS.

Figure 4:
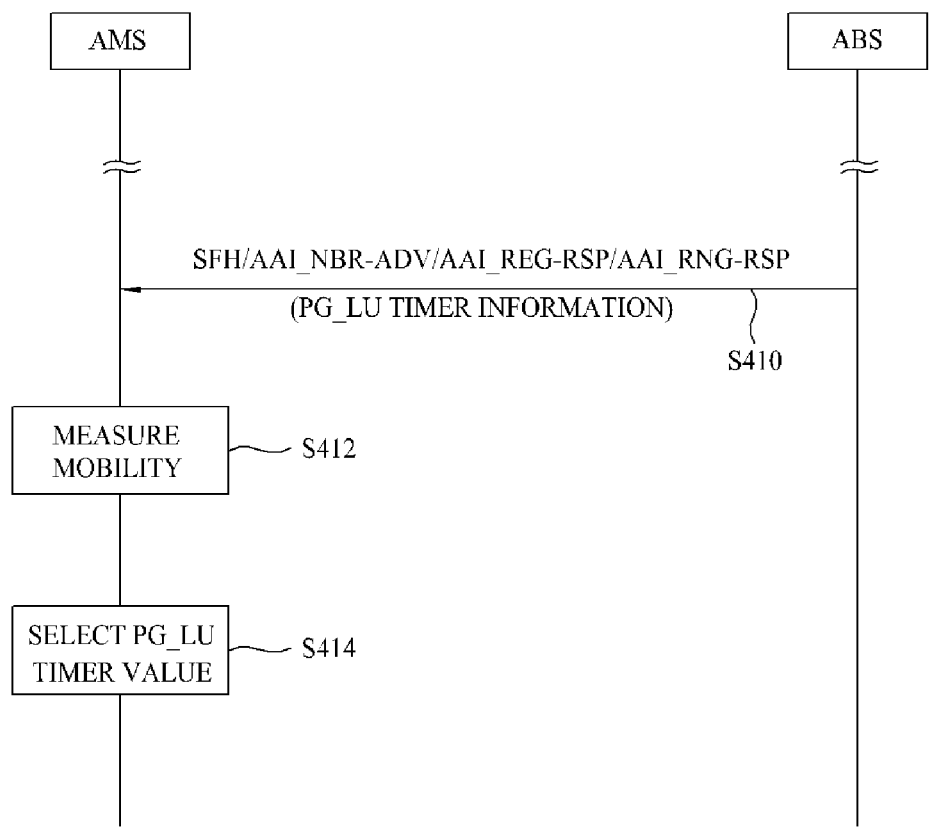
FIG. 4 is a diagram illustrating a signal flow for a method for setting a PG_LU timer value based on mobility information about a Mobile Station (MS) according to an embodiment of the present invention.

FIG. 4 is a diagram illustrating a signal flow for various methods for setting a PG_LU timer value based on mobility information about an AMS according to an embodiment of the present invention.

One of PG_LU timer value setting methods is that both an AMS and an ABS have a set of predefined PG_LU timer values. Specifically, the AMS measures its mobility information and selects an appropriate PG_LU timer value from the PG_LU timer value set according to the mobility information.

Another PG_LU timer value setting method is that an AMS notifies an ABS or a PC of its mobility information and receives PG_LU timer information determined based on the mobility information from the ABS or the PC.

For example, the AMS may notify the ABS or the PC of one of values indicating, for example, Fast, Medium and Slow as its mobility information according to its mobility level, such as a velocity of the AMS. Or the AMS may notify the ABS or the PC of its mobility information expressed as the absolute value of its velocity. Then the ABS or the PC sets PG_LU timer information according to the mobility information and notifies the AMS of the PG_LU timer information.

Table 1 and Table 2 illustrate formats of AMS mobility information.

TABLE 1

| Name | Size(bits) | Notes |
|---|---|---|
| AMS mobility Information | 2 | 00: Fast 01: Medium 10: Slow 11: Reserved |

TABLE 2

| Name | Size(bits) | Notes |
|---|---|---|
| AMS mobility Information | Variable(preferably, 8 bits) | 0x00 0x01 ... 0xFF: reserved |

The ABS mobility information format illustrated in Table 1 is applied to the case where mobility information indicates the velocity of an AMS in 2 bits. Specifically, the AMS may set its mobility information to indicate a mobility level such as Fast, Medium or Slow according to its current velocity or the mean value of its velocities during a predefined time period.

The ABS mobility information format illustrated in Table 2 may be used to indicate the absolute value of the current velocity of the AMS, preferably in 8 bits. Thus the AMS may notify the ABS of the absolute value of its current velocity or the absolute value of the mean value of its velocities during a predefined time period.

In accordance with a third PG_LU timer value setting method, each ABS or PC has a unique PG_LU timer value set. The ABS or PC determines a PG_LU timer value for each AMS based on the mobility information of the AMS and unicasts the PG_LU timer value to the AMS. Alternatively or additionally, the ABS or PC multicasts or broadcasts the PG_LU timer value set to AMSs by, for example, a Super-Frame Header (SFH) or A-MAP message etc.

Preferably, the minimum value of the PG_LU timer starts from a value smaller than paging retry count×paging cycle in the embodiments of the present invention.

Referring to FIG. 4, a PG_LU timer value may be determined according to one of the afore-described three methods. In accordance with the first method, step S410 is not required and an AMS may determine a PG_LU timer value in steps S412 and S414.

In accordance with the second method, the AMS transmits its mobility information configured as illustrated in Table 1 or Table 2 to the ABS by an Advanced Registration Request (AAI_REG-REQ) message or an Advanced Ranging Request (AAI_RNG-REQ) message before step S410.

Specifically, when the AMS registers to a new ABS or performs a location update with the new ABS, the AMS may transmit an AAI_REG-REQ or AAI_RNG-REQ message including its mobility information to the ABS. The ABS and/or PC may determine a PG_LU timer value based on the mobility information and allocate an appropriate paging group to the AMS.

Accordingly, the ABS may transmit to the AMS an Advanced Air Interface Registration Response (AAI_REG-RSP) or Advanced Air Interface Ranging Response (AAI_RNG-RSP) message including one or more of PG_LU timer information and Paging Group (PG) information that are determined based on the mobility information as in step S410.

When the third method is employed, the ABS may multicast or broadcast an SFH or an Advanced Air Interface Neighbor Advertisement (AAI_NBR-ADV) message, which includes a PG_LU timer value set to the AMS.

The AMS may measure its mobility in relation to its velocity in step S412 and determine a PG_LU timer value according to the mobility, referring to the PG_LU timer value set received from the ABS in step S414.

Table 3 illustrates an exemplary PG_LU timer information format.

TABLE 3

| Name | Size(bits) | Notes |
|---|---|---|
| PG_LU_Timer Information | Variable | 0x00: Min0x01: Medium0x10: Max (N frames)0x11: reserved |

Table 3 illustrates PG_LU timer information for the case where mobility information is configured to indicate Fast, Medium or Slow. A minimum PG_LU timer value is preferably set to be smaller than (paging retry count×paging cycle) of the ABS. PG_LU_Timer Information in Table 3 may be defined as a global variable (i.e. predetermined values) and the AMS may cache the information to implicitly know a PG_LU timer value. For example, if the mobility information indicates Fast, PG_LU_Timer Information may be set to a minimum value (Min) mapped to Fast.

Table 4 illustrates another PG_LU timer information format.

TABLE 4

| Name | Size(bits) | Notes |
|---|---|---|
| PG_LU_Timer Information | Variable | 0x00: Min . . . 0xFE: Max (N frames)0xFF: reserved |

The PG_LU timer information format illustrated in Table 4 is available when the current velocity or mean velocity of the AMS is indicated by mobility information. In this case, a PG_LU timer value mapped to the velocity of the AMS may be selected from among 254 timer values raging from a minimum value to a maximum value. The minimum of the PG_LU timer values is preferably set to be smaller than (paging retry count×paging cycle) of the ABS, as in Table 3.

It is preferred that the AMS and/or the ABS has the PG_LU timer information illustrated in Table 3 or Table 4. The PG_LU timer information preserved at the AMS may be updated depending on each ABS. In addition, the PG_LU timer information configured as illustrated in Table 3 or Table 4 may carry a PG_LU timer value set, that is, all PG_LU timer values, or a particular PG_LU timer value (e.g. an index).

Figure 5:
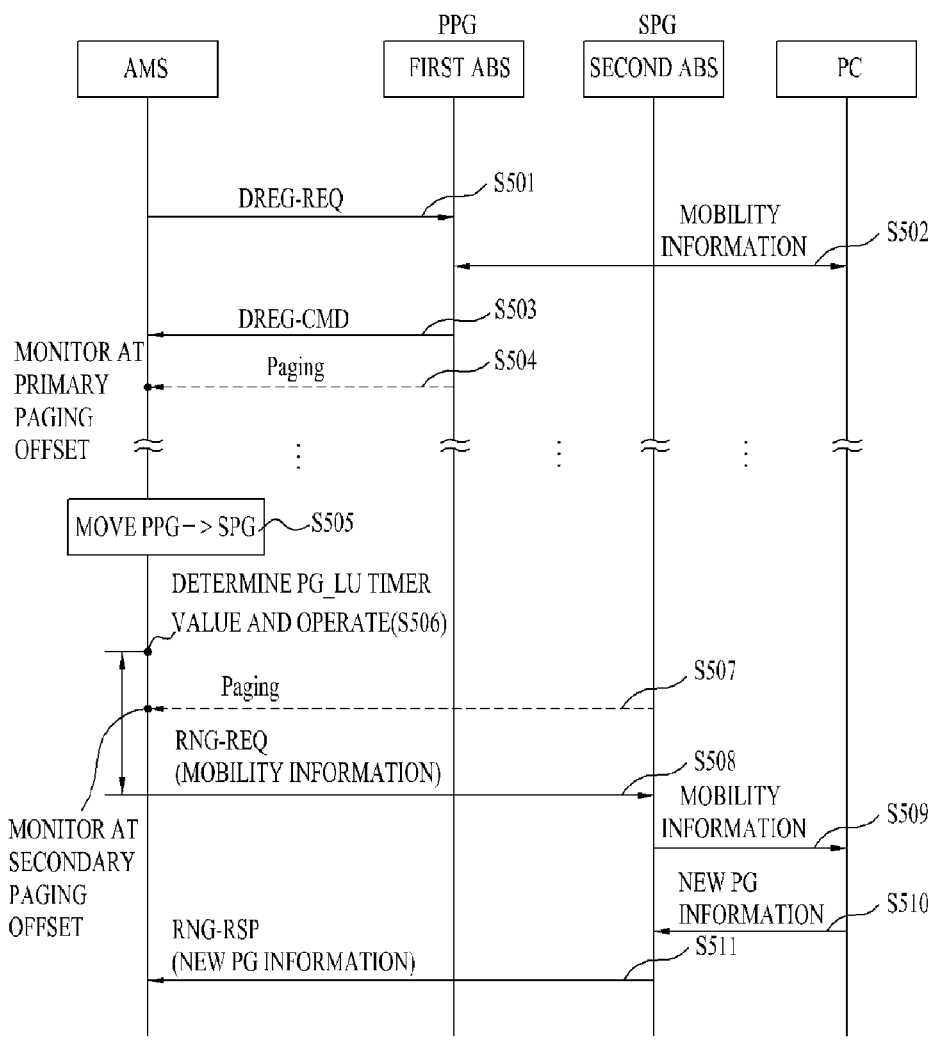
FIG. 5 is a diagram illustrating a signal flow for a method for performing a location update using the PG_LU timer according to an embodiment of the present invention.

FIG. 5 illustrates a method for performing a location update using a PG_LU timer according to an embodiment of the present invention.

In idle mode, paging may be performed on a paging group basis. For example, an AMS may be a member of one or more paging groups. In each paging group, upon receipt of an incoming call for the AMS or a user packet directed to the AMS from an external network, a PC pages to locate the AMS. The PC transmits a paging message to all ABSs within the paging group. Upon receipt of the paging message, each ABS may broadcast a paging message (e.g. a Mobile Paging Advertisement (MOB_PAG-ADV) message) to AMSs. In this manner, the AMS is paged.

In FIG. 5, it is assumed that the AMS preserves predefined PG_LU timer information or receives the predefined PG_LU timer information from the ABS by an SFH and/or an AAI_NBR-ADV message. Mobility information may be configured in the format illustrated in Table 1 or Table 2 and the PG_LU timer information may be configured in the format illustrated in Table 3 or Table 4.

It is also assumed that a first ABS (a serving ABS) is in the paging area of a PPG and a second ABS (a target ABS) is in the paging area of an SPG.

Referring to FIG. 5, the AMS transmits a Mobile Deregistration Request (AAI_DREG-REQ) message to the first ABS in order to request deregistration and initiation of idle mode to the first ABS in step S501.

Upon receipt of the AAI_DREG-REQ message, the first ABS may share idle mode-related information with a PC over a backbone network in step S502. Specifically, the first ABS may notify the PC of the ID of the AMS (MS ID) that intends to enter the idle mode and the ID of the first ABS (BS ID). The PC may in turn transmit a PGID or a PC ID to the first ABS. The PGID or PC ID may be used in transmitting and receiving a paging message.

In FIG. 5, the PC may assign one or more paging groups to the AMS. Thus the PC may notify the first ABS of PG information (e.g. a primary PGID, a secondary PGID, a primary paging offset, and a secondary paging offset).

The first ABS may transmit a Mobile Deregistration Command (AAI_DREG-CMD) message to the AMS as a response to the AAI_DREG-REQ message in step S503. The AAI_D-

REG-CMD message may include paging information such as paging cycle, paging offsets, and a paging listening interval. The MOB_DREG-CMD message may further include at least one of the PC ID indicating the PC which manages and retains the AMS's idle mode information and the PG information (e.g. the primary PGID, the secondary PGID, the primary paging offset, and the secondary paging offset), or a temporary ID.

Referring to FIG. 5, the AMS may receive a paging message based on the paging information and the PG information included in the AAI_DREG-CMD message in the paging area of the PPG. For example, the AMS may monitor a radio channel during a paging listening interval to determine whether there is a paging message directed to the AMS in step S504. Specifically, the AMS may monitor a paging message of the PPG transmitted by the first ABS at a time corresponding to the primary paging offset. During the rest, the AMS may operate in sleep mode (radio turn-ff) to save power.

In step S505, the AMS may move out of the paging area of the PPG and enter the paging area of the SPG.

After moving into the paging area of the SPG, the AMS may activate the PG_LU timer in step S506. Specifically, the AMS may determine a PG_LU timer value mapped to its velocity from a predefined PG_LU timer value set.

During running the PG_LU timer, the AMS does not perform a location update. The AMS may monitor a paging message transmitted from the second ABS at a time corresponding to the secondary paging offset in step S507.

If the AMS stays in the SPG without returning to the PPG even upon expiration of the PG_LU timer, the AMS may perform location update process with the second ABS in step S508. Specifically, the AMS may transmit a AAI_RNG-REQ message including its mobility information to the second ABS.

The second ABS transmits the mobility information of the AMS to the PC over the backbone network in step S509.

The PC may allocate a new paging group to the AMS based on the mobility information and transmit new PG information (e.g. a new primary PGID, a new secondary PGID, a new primary paging offset, and a new secondary paging offset) to the second ABS in step S510.

In step S511, the second ABS may transmit a AAI_RNG-RSP message including the new PG information. Thus the AMS may operate in the idle mode based on the new PG information.

Figure 6:
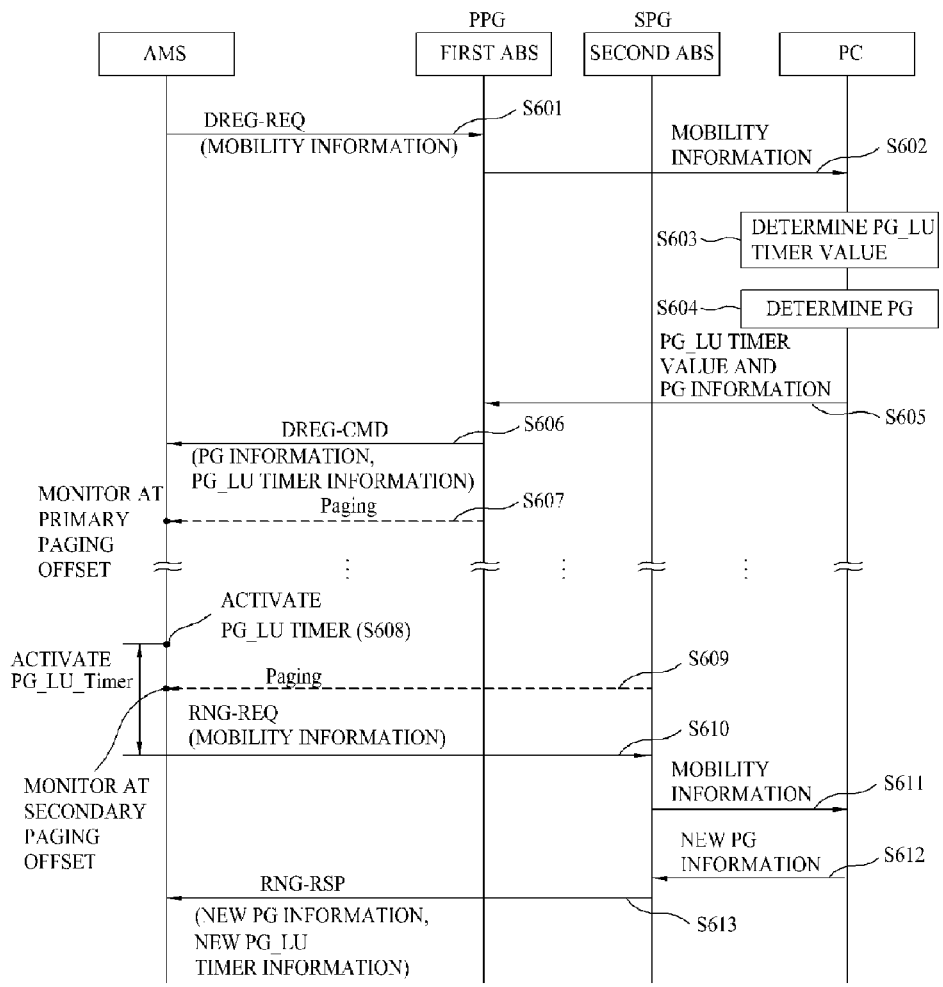
FIG. 6 is a diagram illustrating a signal flow for a method for performing a location update using the PG_LU timer according to another embodiment of the present invention.

FIG. 6 illustrates a method for performing a location update using a PG_LU timer according to another embodiment of the present invention.

The location update procedure illustrated in FIG. 6 is for the case where the first ABS or the PC unicasts PG_LU timer information to the AMS. The AMS may acquire its mobility information in normal state in various manners. Mobility information may be configured in the format illustrated in Table 1 or Table 2 and the PG_LU timer information may be configured in the format illustrated in Table 3 or Table 4.

It is assumed that the first ABS (a serving ABS) is in the paging area of the PPG and the second ABS (a target ABS) is in the paging area of the SPG.

Referring to FIG. 6, the AMS transmits a AAI_DREG-REQ message to the first ABS in order to request deregistration and initiation of idle mode to the first ABS in step S601.

Upon receipt of the DREG-REQ message, the first ABS may share idle mode-related information with the PC over the backbone network. Specifically, the first ABS may notify the PC of the ID of the AMS (MS ID) that intends to enter the idle mode and the ID of the first ABS (BS ID) in step S602.

The PC may determine PG_LU timer information based on the mobility information in step S603.

The PC may also determine a paging group based on the mobility information in step S604. One or more paging groups may be allocated to the AMS. Herein, it is assumed that a PGG and an SPG are allocated to the AMS.

Then the PC may notify the first ABS of the determined PG_LU timer information and PG information in step S605. The PG information may include a primary PGID, a secondary PGID, a primary paging offset, and a secondary paging offset. The PGIDs or a PC ID may be used in transmitting and receiving a paging message.

The first ABS may transmit an AAI_DREG-CMD message (or, AAI_DREG-RSP) to the AMS as a response to the AAI_DREG-REQ message in step S606. The AAI_DREG-CMD message may include one or more of paging information, the PG_LU timer information, the PG information, the PC ID, and a temporary ID.

Referring to FIG. 6, upon receipt of the AAI_DREG-CMD message, the AMS may enter idle mode and monitor a paging message based on the paging information and PG information included in the AAI_DREG-CMD message in the paging area of the PPG. For example, the AMS may monitor a radio channel during a paging listening interval to determine whether there is a paging message directed to the AMS.

Specifically, the AMS may monitor a paging message of the PPG transmitted by the first ABS at a time corresponding to the primary paging offset and operate in sleep mode (radio turn-ff) during the rest to save power in step S607.

The AMS may move out of the paging area of the PPG and enter the paging area of the SPG. After moving into the paging area of the SPG, the AMS may activate the PG_LU timer based on the PG_LU timer information receive in step S606.

Specifically, if the PG_LU timer information includes a PG_LU timer value set, the AMS may select a PG_LU timer value mapped to its velocity from the PG_LU timer value set. On the other hand, if the PG_LU timer information includes the index of a PG_LU timer or a specific PG_LU timer value determined according to the mobility information by the ABS or the paging controller, the AMS may activate the PG_LU timer to the PG_LU timer value.

During running the PG_LU timer, the AMS does not perform a location update. The AMS may monitor a paging message transmitted from the second ABS at a time corresponding to the secondary paging offset in step S609.

If the AMS stays in the SPG without returning to the PPG even upon expiration of the PG_LU timer, the AMS may update its location with the second ABS in step S610. That is, the AMS may transmit a RNG-REQ message including its mobility information to the second ABS.

The second ABS transmits the mobility information of the AMS to the PC over the backbone network in step S611.

The PC may assign a new paging group to the AMS based on the mobility information and transmit new PG information (e.g. a new primary PGID, a new secondary PGID, a new primary paging offset, and a new secondary paging offset) to the second ABS in step S612.

In step S613, the second ABS may transmit to the AMS an RNG-RSP message including at least one of the new PG information and new PG_LU timer information. Thus the AMS may operate in the idle mode based on the new PG information.

Figure 7:
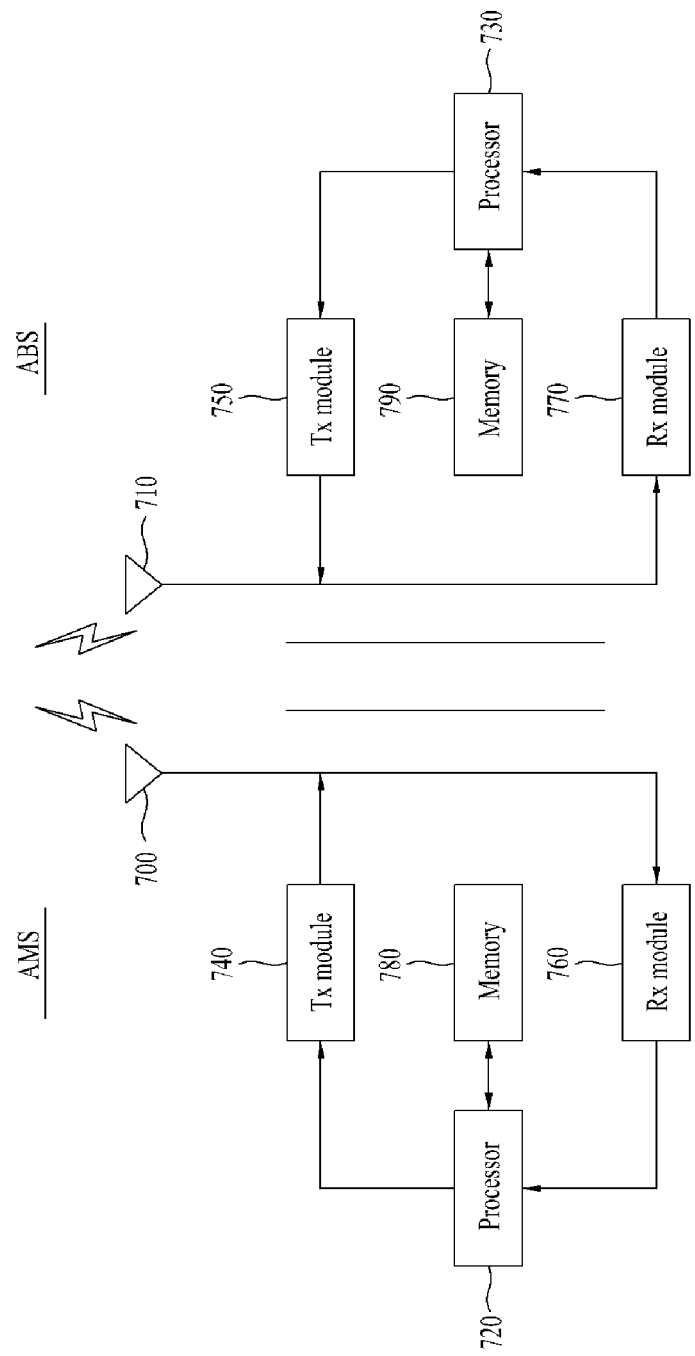
FIG. 7 is a block diagram of a BS and an MS for performing the embodiments of the present invention illustrated in FIGS. 2 to 6 according to an embodiment of the present invention.

FIG. 7 is a block diagram of an ABS and an AMS for performing the embodiments of the present invention illustrated in FIGS. 2 to 6 according to an embodiment of the present invention.

Referring to FIG. 7, the AMS and the ABS include antennas 700 and 710 for transmitting and receiving information, data, signals and/or messages, Transmission (Tx) modules 740 and 750 for transmitting messages by controlling the antennas 700 and 710, Reception (Rx) modules 760 and 770 for receiving messages by controlling the antennas 700 and 710, memories 780 and 790 for temporarily or persistently information related with communications with the ABS and data generated during the operations of processors 720 and 730, and the processors 720 and 730 for controlling the Tx modules 740 and 750, the Rx modules 760 and 770, and the memories 780 and 790.

The antennas 700 and 710 transmit signals generated from the Tx modules 740 and 750 in the air interface or provide radio signals received in the air interface to the Rx modules 760 and 770. If Multiple Input Multiple Output (MIMO) is supported, two or more antennas may be used.

The processors 720 and 730 provide overall control the operations of the AMS and the ABS, respectively. Especially, the processors 720 and 730 may perform a control function, a Media Access Control (MAC) frame conversion control function based on service characteristics and propagation environments, a handover function, authentication, and encryption in order to perform the afore-described embodiments of the present invention. In addition, the processors 720 and 730 each may further include an encryption module for controlling encryption of messages and a timer module for controlling transmission and reception of the messages.

The Tx modules 740 and 750 may provide signals and/or data scheduled by the processors 720 and 730 to the antennas 700 and 710 after predetermined coding and modulation.

The Rx modules 760 and 770 may recover original data by decoding and demodulating radio signals received through the antennas 700 and 710 over the interface and provide the original data to the processors 720 and 730.

The memories 780 and 790 may store programs required for processing and controlling in the processors 720 and 730, and temporarily stores input/output data (in the AMS, uplink grant inform, system information, a Station ID (STID), a Flow ID (FID), an action time, resource allocation information, and frame offset information, etc., received from the ABS).

The memories 780 and 790 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Read-Only Memory (ROM), an Electrically Erasable Programmable Read-Only Memory (EEPROM), a Programmable Read-Only Memory (PROM), a magnetic memory, a magnetic disc, and optical disk.

The embodiments of the present invention described before with reference to FIGS. 2 to 6 may be implemented by the components and functions of the AMS and the ABS described above with reference to FIG. 7. Now a detailed description will be made of functions of the AMS and the ABS.

The processors 720 and 730 of the AMS and the ABS each may further include an idle mode module and a timer module for performing the idle-mode operations according to the embodiments of the present invention. Especially, the processor 720 of the AMS may acquire mobility information by measuring its velocity during a normal-mode operation or an idle-mode operation.

The processor 720 of the AMS may preserve a predefined PG_LU timer value set or a PG_LU timer value set unicast or broadcast by the ABS. Therefore, the AMS may activate a PG_LU timer based on its mobility information.

The AMS may receive a paging message from the ABS or a PC or perform a location update based on PG information and PG_LU timer information by controlling the Tx module 740, the Rx module 760 and the processor 720.

For example, the AMS may monitor a paging message at a primary paging offset in a PPG. When the AMS moves to an SPG, the AMS may start the PG_LU timer and monitor a paging message at a secondary paging offset while the PG_LU timer is running. Upon expiration of the PG_LU timer, the AMS may update its location with an ABS. This operation has been described in detail with reference to FIGS. 3 to 6. Accordingly, the AMS reduces the number of unnecessary location updates, thereby mitigating overhead imposed on a network.

The ABS (or PC) may determine PG_LU timer information and PG information based on the mobility information of the AMS by controlling the Tx module 750, the Tx module 770 and the processor 730. The ABS may unicast or multicast the PG_LU timer information and the PG information during an idle-mode operation. Therefore, upon generation of a call or downlink data for the AMS, the ABS or the PC may transmit a paging message at the primary or secondary paging offset. This operation has been described in detail with reference to FIGS. 3 to 6.

The embodiments of the present invention may be achieved by various means, for example, hardware, firmware, software, or a combination thereof.

In a hardware configuration, the methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. Software codes may be stored in the memories 780 and 790 and executed by the processors 720 and 730. The memories are located at the interior or exterior of the processor and may transmit and receive data to and from the processors via various known means.

In the embodiments of the present invention, an ABS may be a serving ABS (a first ABS) or a second ABS. The concepts of the first and second ABSs are relative. The serving ABS refers to an ABS that provides services to an AMS when the AMS enters idle mode.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The embodiments of the present invention are applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for performing an idle-mode operation at a Mobile Station (MS) to which one or more paging groups are allocated, the method comprising:
  transmitting a deregistration request message requesting initiation of idle mode to a first Base Station (BS), wherein the deregistration request message includes mobility information indicating a mobility level of the MS, the mobility level representing a moving speed of the MS;
  receiving a deregistration command message including paging group information from the first BS, wherein the paging group information includes a primary paging group Identifier (ID) and a primary paging offset of a primary paging group allocated to the MS, and a secondary paging group ID, and a secondary paging offset of a secondary paging group allocated to the MS; and
  activating a paging group location update timer after moving from the primary paging group to the secondary paging group,
  wherein the primary paging group and the secondary paging group are set based on the mobility information, and
  wherein the mobility information indicates the mobility level of the MS as one of fast, medium, or slow.

2. The method according to claim 1, further comprising:
  monitoring a paging message at the primary paging offset; and
  monitoring a paging message at the secondary paging offset when the paging message is not received at the primary paging offset.

3. A method for supporting an idle-mode operation of a Mobile Station (MS) to which one or more paging groups are allocated, the method comprising:
  receiving a deregistration request message requesting initiation of idle mode from the MS, wherein the deregistration request message includes mobility information indicating a mobility level of the MS, the mobility level representing a moving speed of the MS; and
  transmitting, to the MS, a deregistration command message including paging group information, wherein the paging group information includes a primary paging group Identifier (ID), and a primary paging offset of a primary paging group allocated to the MS, a secondary paging group ID, and a secondary paging offset of a secondary paging group allocated to the MS,
  wherein the primary paging group and the secondary paging group are set based on the mobility information, and
  wherein the mobility information indicates the mobility level as one of fast, medium, or slow.

4. The method according to claim 3, wherein the deregistration command message further includes paging group location update timer information set based on the mobility information.

5. The method according to claim 3, further comprising transmitting a paging message to the MS at the primary paging offset.

6. A Mobile Station (MS) in idle mode, to which one or more paging groups are allocated, the MS comprising:
  a transmitter configured to transmit a message;
  a receiver configured to receive a message; and
  a processor configured to control an idle-mode operation of the MS;
  wherein the transmitter is configured to transmit a deregistration request message requesting initiation of idle mode to a first Base Station (BS), wherein the deregistration request message includes mobility information indicating a mobility level of the MS, the mobility level representing a moving speed of the MS,
  wherein the receiver is configured to receive a deregistration command message including paging group information from the first BS, wherein the paging group information includes a primary paging group Identifier (ID), a primary paging offset of a primary paging group allocated to the MS, a secondary paging group ID, and secondary paging offset of a secondary paging group allocated to the MS,
  wherein the processor causes activation of a paging group location update timer after moving from the primary paging group to the secondary paging group,
  wherein the primary paging group and the secondary paging group are set based on the mobility information, and
  wherein the mobility information indicates the mobility level as one of fast, medium, or slow.

7. The MS according to claim 6, wherein the mobility information indicates the mobility level of the MS as one of fast, medium, and slow.

8. The MS according to claim 1, wherein the processor further causes:
  monitoring of a paging message at the primary paging offset; and
  monitoring a paging message at the secondary paging offset when the paging message is not received at the primary paging offset.

9. A base station (BS) for supporting an idle-mode operation of a Mobile Station (MS) to which one or more paging groups are allocated, the BS comprising:
  a processor configured to control the idle-mode operation of the MS;
  a receiver configured to receive a deregistration request message requesting initiation of idle mode from the MS, wherein the deregistration request message includes mobility information indicating a mobility level of the MS, the mobility level representing a moving speed of the MS; and
  a transmitter configured to transmit to the MS a deregistration command message including paging group information, wherein the paging group information includes a primary paging group Identifier (ID), primary paging offset of a primary paging group allocated to the MS, a secondary paging group ID, and a secondary paging offset of a secondary paging group allocated to the MS,
  wherein the primary paging group and the secondary paging group are set based on the mobility information, and
  wherein the mobility information indicates the mobility level of the MS as one of fast, medium, or slow.

10. The base station according to claim 9, wherein the mobility information indicates the mobility level of the MS as one of fast, medium, or slow.

11. The base station according to claim 9, wherein the deregistration command message further includes paging group location update timer information set based on the mobility information.

12. The base station according to claim 9, wherein the transmitter is further configured to transmit a paging message to the MS at the primary paging offset.

13. The method according to claim 1, further comprising performing, at the MS, paging group location update after the time expires to inform its mobility information.

14. The method according to claim 1, wherein the paging offsets and the paging group IDs are assigned according to a number of paging groups assigned to the MS.

* * * * *